Nov. 1, 1955  C. F. AMMANN  2,722,583
PORTABLE HIGH-CURRENT CAPACITY SWITCHING DEVICE
Filed June 1, 1953  3 Sheets-Sheet 1
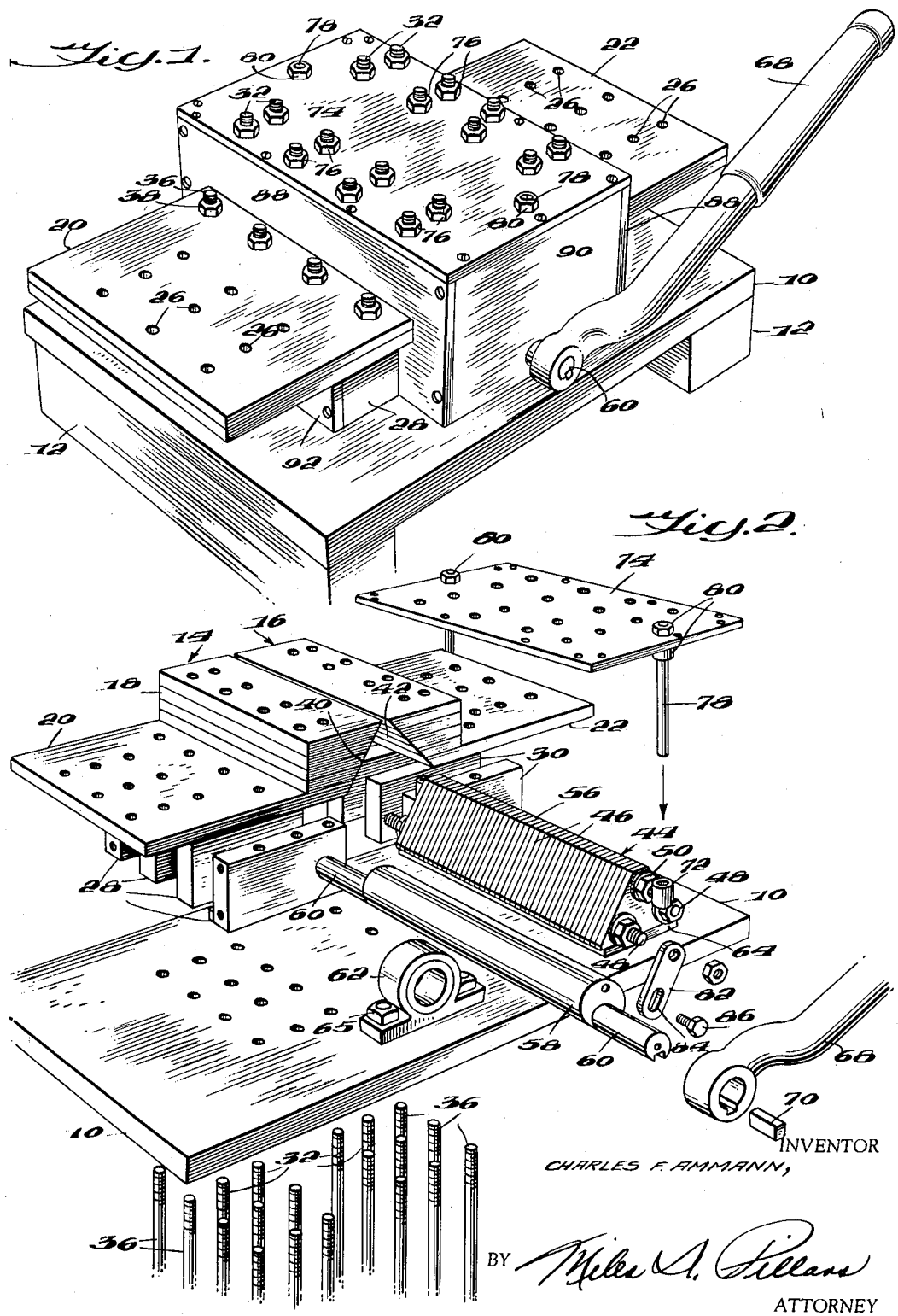
INVENTOR
CHARLES F. AMMANN,
BY
ATTORNEY Nov. 1, 1955     C. F. AMMANN     2,722,583
PORTABLE HIGH-CURRENT CAPACITY SWITCHING DEVICE
Filed June 1, 1953     3 Sheets-Sheet 2
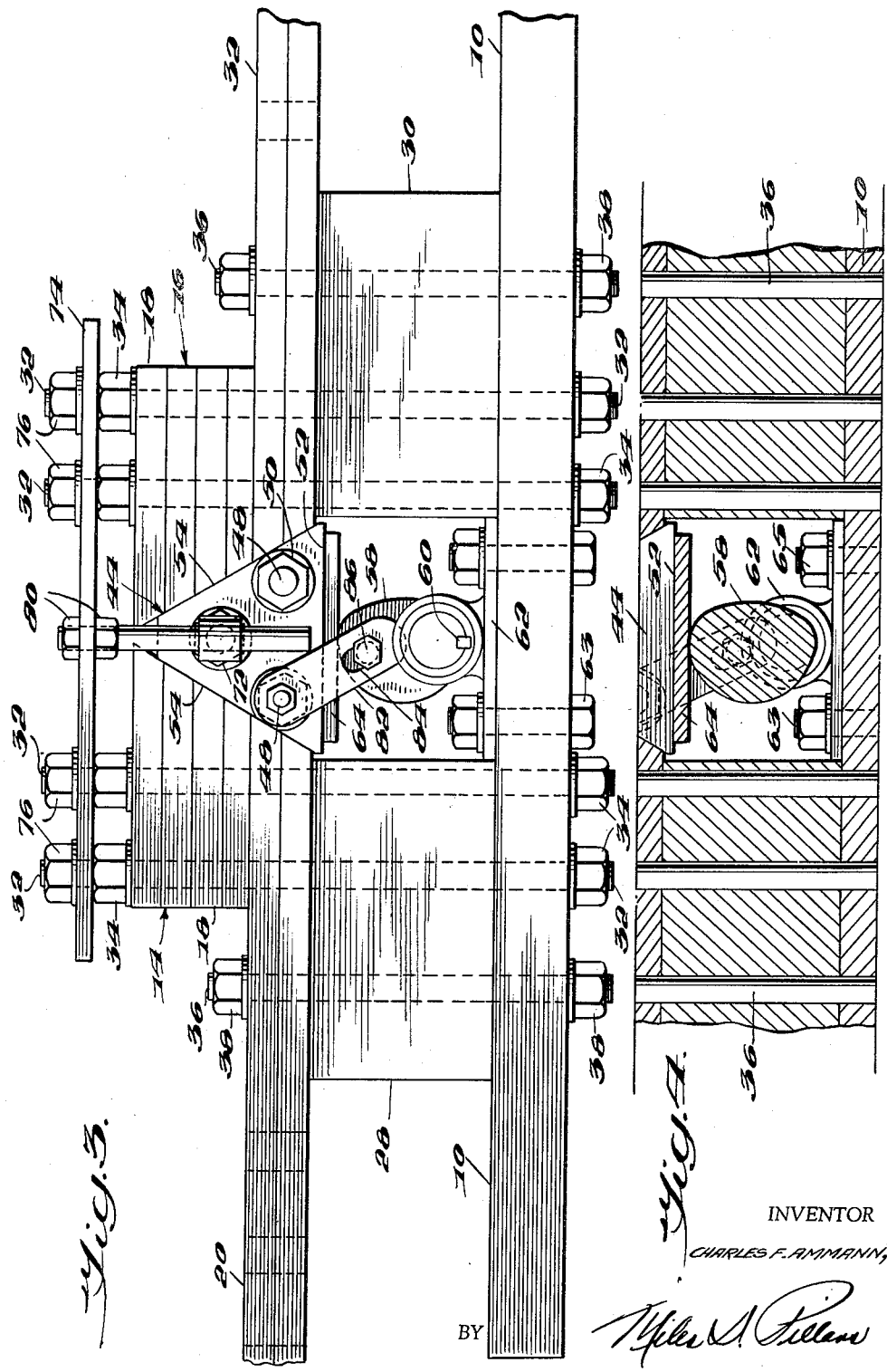
INVENTOR
CHARLES F. AMMANN,
BY
ATTORNEY Nov. 1, 1955     C. F. AMMANN     2,722,583
PORTABLE HIGH-CURRENT CAPACITY SWITCHING DEVICE
Filed June 1, 1953     3 Sheets-Sheet 3
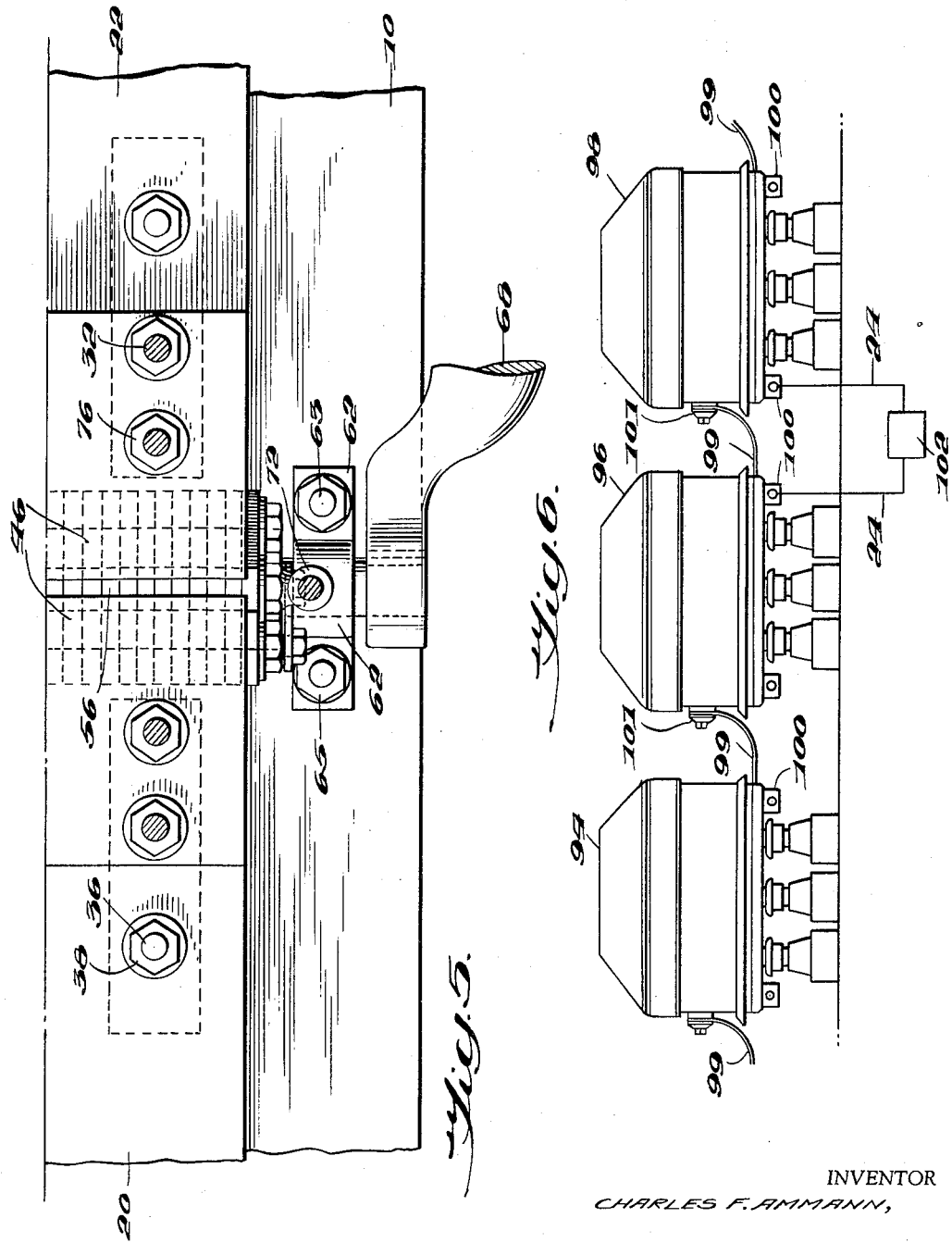
INVENTOR
CHARLES F. AMMANN,
BY
ATTORNEY

United States Patent Office 2,722,583
Patented Nov. 1, 1955

2,722,583

PORTABLE HIGH-CURRENT CAPACITY SWITCHING DEVICE

Charles F. Ammann, Freeport, Tex., assignor to The Dow Chemical Company, Midland, Mich., a corporation of Delaware Application June 1, 1953, Serial No. 358,857

4 Claims. (Cl. 200—163)

This invention relates to portable circuit making and breaking devices and more particularly to high-current capacity switches for short circuiting one or more selected electrolytic cells operating in a battery or multiple batteries of unit cell assemblies.

In carrying out on a commercial scale the electrolysis of various electrolytes, illustrative of which are aqueous salt solutions and molten baths containing metal salts, oxides or the like, it is well known to assemble a plurality of unit cells into batteries which are electrically connected and energized from a common source of electrical energy. The individual cells of the battery may be connected in series or in parallel and sub-groups thereof may be connected in series-parallel arrangements depending upon cathode and anode arrangements, cell size, electrolyte characteristics, voltage and current conditions, and other factors. In order to effect the electrolysis of the electrolyte, the unit cells are energized by currents of large magnitude which may exceed 60,000 amperes at relatively low potentials. Upon the failure of an individual cell, the need for inspection and maintenance arises, such for example as the renewal of cathodes or anodes, and it is known to electrically deenergize an individual cell of a battery by by-passing the current through a short circuiting switch which may be connected between either the anode-anode or cathode-cathode elements of succeeding cells in the circuit.

In order that the short circuiting switch may be readily connected by high current capacity cables of minimum length, it is desirable to provide a portable circuit making and breaking device which is of a size to facilitate the positioning of the switching device physically within the cell battery, i. e. between the rows of cells, adjacent to the unit cell or group of succeeding cells which is to be electrically short circuited. Switching means heretofore suggested for this class of service have been found unsuitable in that due to excessive heating owing to the high current load and damage due to corrosion, warpage of the contacting parts and the loss of resiliency of the biasing springs occur. Further, in use the contacts tend to weld in closed position and become pitted, thus resulting in either an inoperative device or a material decrease in current carrying capacity. In addition, the contacting surfaces and movable parts of the prior art devices corroded in the atmosphere of the cell rooms to reduce the overall life of the switching mechanism.

It is, therefore, an object of this invention to provide an improved portable high-current capacity switch device which may be positively operated to both circuit making and circuit breaking positions.

Another object of the invention is to provide an improved portable high-current capacity switch, the contacts of which are moved by the use of camming mechanism, thus eliminating the need of the heretofore used biasing springs which quickly lose their resilient property under the influence of the heat generated and action of corrosive gases.

Another object of this invention is to provide an improved high-current capacity circuit making and breaking device which utilizes a pair of fixed laminated electrodes mounted in end to end relationship and spaced a distance apart with the facing ends thereof formed in acute angular relationship, and a bridging member formed with complementary contacting surfaces which may be positively moved into and out of engagement with the contacting end surfaces of the fixed electrodes.

A further object of this invention is to provide an improved high-current capacity switch provided with a pair of spaced and fixed contacts formed of superposed laminations and a movable bridging member formed of a plurality of laminations of conductive material which extend at right angles with respect to the laminations of fixed contacts.

A further object is to provide an improved high capacity switching device for use with electrolytic cells, the contacting surfaces and operating mechanism of which are enclosed to eliminate corrosion of the parts which otherwise would occur due to the corrosive atmosphere in the vicinity of the cells.

A still further object of this invention is to provide an improved high-current capacity circuit making and breaking device capable of easy and economical fabrication, the parts of which are readily accessible for operations incident to use, repair and replacement.

The invention also resides in certain novel structural characteristics and features which facilitate the carrying out of the foregoing objects, and which contribute both to the simplicity of the portable high-current capacity switching device and to its ruggedness of construction.

Further objects of the invention will become apparent from the following detailed description taken in connection with the accompanying drawings, in which:

Figure 1 is a perspective view of the improved portable high-current capacity switch showing the covering for the switch parts in position;

Figure 2 is an expanded perspective view showing the operating elements and mountings therefor;

Figure 3 is an enlarged side elevation with the enclosure removed showing the switch in circuit closed position;

Figure 4 is a fragmentary cross section partially in elevation showing the coaction of the camming mechanism and the movable bridging member;

Figure 5 is a plan view with cover removed of one side of the switching mechanism showing the direction and position of the conducting laminations of the movable bridging member; and Figure 6 is an exemplary diagrammatic showing of the improved switch connected to short-circuit the anode-anode elements of succeeding unit cells series connected in a battery of electrolytic alkali chlorine cells.

While the invention is susceptible of various modifications and alternative constructions, I have shown in the drawings and will herein describe in detail the preferred embodiment. In order to facilitate the description of the invention, its use in conjunction with a battery of electrolytic cells for the decomposition of water-soluble salts will be described. It will be understood, however, that I do not intend to limit the invention by such disclosure, for I aim to cover its use in conjunction with other types of electrolytic cells and to cover all modifications and alternative constructions falling within the spirit and scope of the invention as defined in the appended claims.

Reference numeral 10 indicates an elongated generally rectangular base of insulating material upon which is supported the fixed contacts, a movable bridging contact, and contact operating mechanism of the improved portable high-current capacity switching device. The base 10 is preferably mounted upon legs 12 positioned beneath the end extremities of the base which extend transversely of the width thereof, although other means for elevating the base above the floor level may be used. The switching mechanism embodies electrodes provided with fixed contacts generally represented by reference numerals 14 and 16, which are fixedly supported a spaced distance above base 10 as is clearly shown in Figures 2 and 3.

Each of the fixed contacts 14 and 16 is formed by a plurality of laminations 18 which are superposed in contacting relation upon each other. The laminations are preferably formed of generally rectangular copper plates provided with substantially parallel surfaces and the lowermost laminations identified by reference numerals 20 and 22 of fixed contacts 14 and 16 are provided with extensions which serve as connecting terminals to which the high-current capacity conductors 24 are electrically connected when the switch is operatively positioned in a by-pass or jumper circuit between anode-anode or cathode-cathode of one or more succeeding cells in a bank or battery. A plurality of apertures 26 are drilled in the extensions of laminations 20 and 22 to facilitate the attachment of the conductor cables or buses 24 by the use of conventional connecting devices.

The fixed contacts 14 and 16 are mounted in end to end relationship with the facing ends 40 and 42 spaced a distance apart, as is best shown in Figures 2 and 3. The superposed laminations which constitute fixed contacts 14 and 16 are mounted in planes substantially parallel to the plane of base 10, and are spaced from the surface of the base by a plurality of spacers 28 located between the base and fixed contact 14 and spacers 30 located between the base and fixed contact 16. The laminations of each of fixed contacts 14 and 16 are mounted in superposed contacting relation and secured in spaced relation to the base by a plurality of transverse rows of studs 32 which pass therethrough and through the intermediately positioned spacers. Studs 32 are threaded at each end thereof to receive nuts 34 which are positioned at one end above the uppermost lamination of the fixed contacts and at the other end beneath base 10. Studs 36 which are arranged in a transverse row substantially parallel to the rows of studs 32 pass through the extensions of laminations 20 and 22, the respective spacers and base 10 to further secure in place on the base the extensions of fixed contacts 14 and 16 when the nuts 38 are tightened on the opposite ends thereof, as is shown in Figure 3.

The spaced apart facing ends 40 and 42 of fixed contacts 14 and 16 are formed with smooth surfaces lying in converging planes which are inclined in acute angular relationship with respect to the plane of the laminations and to the base 10. As shown in Figure 2, the converging general rectangular surfaces of the facing ends of fixed contacts 14 and 16 form a wedge shaped opening therebetween extending the width of the fixed contacts which constitutes an air gap between the fixed contacts.

A movable bridging member 44 complementary shaped to fit into and close said wedge shaped opening is mounted for movement in a plane substantially at right angles to the planes of the laminations comprising the fixed contacts. The movable bridging member 44 is formed by a plurality of laminations 46 positioned in side by side contacting relation which are secured together by a plurality of studs 48 passing therethrough. The studs are threaded at each end to receive nuts 50 by which the laminations are tightened together in intimate contact. Each of the laminations 46 has a generally triangular contour and is provided with a base 52 and inclined sides 54 which are convergingly directed. Preferably the apex of the triangular formation is removed to provide a side 56 forming a generally truncated triangular configuration of laminations. When a plurality of laminations is assembled to form the movable bridging member 44 in the position and manner shown in Figures 2 and 5, the member comprises a frusto-prism, the inclined rectangular sides of which are complementary to the facing ends 40 and 42 of fixed contacts 14 and 16.

Mechanism for positively moving the inclined sides 54 of bridging member 44 into and out of contact with the facing ends 40 and 42 of fixed contacts 14 and 16 is positioned intermediate the fixed electrodes and base 10. This mechanism comprises a rotatable elongated cam 58 which is mounted on shaft extensions 60 located at each end of the elongated cam. The cam has a general egg-shape and is eccentrically mounted on the shaft extensions, as is shown more clearly in Figures 3 and 4. The shaft extensions 60 are journaled in bearings 62 which are mounted on and adjacent to each side of base 10 by any suitable means, such for example as bolts 63 and coacting nuts 65. The axis of shaft extensions 60 is positioned in alignment with the central plane of movable bridging member 44. The surface of cam 58 engages a cam follower in the form of a plate 64 secured beneath base 52 of the wedge shaped bridging member 44. Shaft extensions 60 and the eccentrically positioned cam 58 may be rotated in bearings 62 by any suitable means, such for example as a power driven actuator or a manually operated device. In order to simplify the description, a hand operating lever 68 is shown for this purpose, which lever is connected by key 70 to the outside end of one of the extension shafts 60. Rotation of hand lever 68 clockwise from its left hand position serves to rotate the eccentrically positioned cam to a position wherein the maximum radius of the cam is immediately positioned beneath the central portion of the bridging member 44, and in this position the surfaces of the inclined sides 54 of the bridging member 44 are in positive contact with the inclined surfaces of the fixed contacts to provide a low resistance path for current flow. In view of the fact that the cam 58 and cam follower 64 extend coextensive with the transverse dimension of the base of the bridging member, an equal pressure is applied to all increments of the inclined surfaces to provide a positive engagement throughout the entire area thereof. It will be apparent that with the movable bridging member maintained in contacting relation by the force applied through the leverage system of the cam mechanism, any tendency of the laminations to warp due to the high current flow will apply further pressure to the contacting elements, since the laminations of the bridging member 44 are positioned at right angles to each other.

In order to ensure that the bridging member 44 will move only in a perpendicular plane to the planes of the laminations constituting fixed contacts 14 and 16 and to the plane of base 10, tubular guide elements 72 are mounted, one on each of the ends of the bridging member. The tubular guide elements are preferably secured to the ends of uppermost stud 48 by coacting threads mounted on the guide elements. A cover top identified by reference numeral 74 is mounted upon studs 32 above nuts 34 and is secured in place by nuts 76 engaging the studs 32. The cover top extends above the facing ends of fixed contacts 14 and 16, bridging member 44, and cam 58 and the bearings therefor. Downwardly extending studs 78 are mounted centrally of each side of said cover by nuts 80 so that the studs slidably engage the interior wall surface of the tubular guides 72. By this structure the movement of bridging member 44 is maintained in a plane at right angles with respect to the direction of the laminations constituting fixed electrodes 14 and 16.

A positive opening of the switch contacts is obtained by virture of pivoted link 82 extending between the movable bridging member 44 and the rotatable cam mechanism. Link 82 is pivotally connected at one end thereof on a stud 48 of the bridging member, and at the other end to the edge of cam 58. An elongated opening or slot 84 is provided in the link through which the shank of screw 86 freely passes, which arrangement provides a lost motion connection between the rotatable cam and the reciprocable bridging member 44. With the bridging member in closed position, rotation of hand lever 68 in a counterclockwise direction will serve to rotate cam surface 58 and its point of greatest radius from beneath the central portion of the cam follower, thus releasing the pressure on cam follower 64 and after slight angular rotation, force will be applied to bridging member 44 through link 82 to move the bridging member out of contact with the facing ends of the fixed contacts. Movement of the bridging member 44 away from facing ends 40 and 42 serves to provide a double break in the path of the current flow whereby the flow is terminated with a minimum of arcing and pitting of contact surfaces.

In order that the corrosive gases of the electrolytic cell room may be excluded from the switch contacts and actuating mechanism of the switch, oppositely positioned side housing members 88 and oppositely positioned end housing members 90 formed of insulating material are mounted in gas tight engagement between the top member 74 and base 10. As shown in Figure 1 extension of laminations 20 and 22 project from the interior of the housing through end members 88 and the shaft extension to which hand lever 68 is attached extends through one of the side walls 90. Covering members 92 span the outer ends of spacers 28 and 30 whereby the switch parts are entirely enclosed by the housing thus provided.

Figure 6 is illustrative of the use of the improved portable high-current capacity switch in by-passing the current around a unit cell of a battery of cells. Reference numerals 94, 96 and 98 indicate a portion of a cell bank of electrolytic chlorine cells wherein the individual cells are connected in series by bus bars or high capacity cables 99 and energized from a common source. In installations of this character, the anode of one cell is connected to the cathode 101 of a succeeding cell. Conductor connecting lugs 100 are positioned externally of the cells and are connected to the anodes thereof. When it is desired for the purpose of either inspection or repair to deenergize a unit or a plurality of unit cells of the battery, the portable switching device indicated by reference numeral 102 in Figure 6 is physically moved between the rows of cells in the bank to a position immediately adjacent to the appropriate cell or cells in order that the length of the connecting cables may be maintained as short as possible. The jumper cables 24 are connected between the terminal extensions 20 and 22 of fixed electrodes 14 and 16 and the anode connecting lugs 100 of the succeeding cell or cells. Movement of the bridging member to contacting position by rotation of hand lever 68 serves to provide a low resistance path between the anode-anode elements of the succeeding cells, thereby deenergizing the short-circuited cells.

I claim:

1. In a switching mechanism the combination comprising, a supporting member, a pair of fixed electrodes mounted upon said supporting member positioned in end to end relationship and spaced a distance apart, said electrodes formed of a plurality of superposed laminations of conductive material with the facing ends thereof formed in acute angular relationship in respect to said supporting member, a movable bridging member formed of a plurality of conducting laminations arranged in contacting side by side relation which is provided with a base and two inclined surfaces formed in angular relation to said base and complementary to the facing ends of the fixed electrodes, means for moving said movable bridging member into positive contacting relation with the facing ends of the fixed electrodes, with the laminations of the movable bridging member disposed at substantially right angles to the direction of the laminations of the fixed electrodes comprising a rotatable element journaled in bearings mounted on said supporting member provided with a camming surface thereon engageable with said movable bridging member, and means for positively withdrawing said movable bridging member from contact relation with the facing ends of said fixed electrodes upon rotation of said rotatable element comprising a link pivotally secured at one end thereof to said movable bridging member and at the other end thereof to said rotatable element.

2. Switching mechanism of the character defined in claim 1 wherein said link is provided with a slot positioned adjacent to one of its ends to provide a lost motion connection between said rotatable element and said movable bridging member.

3. In a switching mechanism the combination comprising, a supporting member, a pair of fixed electrodes mounted upon said supporting member positioned in end to end relationship and spaced a distance apart, said electrodes formed of a plurality of superposed laminations of conductive material with the facing ends thereof formed in acute angular relationship in respect to said supporting member, a movable bridging member formed of a plurality of conducting laminations arranged in contacting side by side relation which is provided with a base and two inclined surfaces formed in angular relation to said base and complementary to the facing ends of the fixed electrodes, means for moving said movable bridging member into positive contacting relation with the facing ends of the fixed electrodes with the laminations of the movable bridging member disposed at substantially right angles to the direction of the laminations of the fixed electrodes comprising a rotatable element journaled in bearings mounted on said supporting member provided with a camming surface thereon engageable with said movable bridging member, means for positively withdrawing said movable bridging member from contact relation with the facing ends of said fixed electrodes upon rotation of said rotatable element comprising a link pivotally secured at one end thereof to said movable bridging member and at the other end thereof to said rotatable element, and a housing cooperating with said supporting member to enclose the facing ends of said fixed electrodes, said movable member, said rotatable element and camming surface and said pivoted link.

4. In a switching mechanism, the combination comprising, a supporting member, a pair of fixed electrodes mounted upon and located substantially parallel to said supporting member which are positioned in end to end relationship and spaced a distance apart, said electrodes formed of a plurality of superposed laminations of conductive material with the facing ends thereof formed in acute angular relationship to said supporting member, a movable bridging member formed of a plurality of conductive laminations arranged in contacting side by side relation which are provided with a base and inclined surfaces formed in angular relation to said base and complementary to the facing ends of the fixed electrodes, said movable bridging member further provided with a guide element positioned at each end of said member, means for moving said movable bridging member into positive contacting relation with the facing ends of the fixed electrodes with the laminations of the movable bridging member disposed at substantially right angles to the direction of the laminations of the fixed electrodes comprising a rotatable element journalled in bearings mounted on said supporting member provided with a camming surface thereon engageable with said movable bridging member, means for positively withdrawing said movable bridging member from contacting relation with the facing ends of said fixed electrodes upon rotation of said rotatable element comprising a link pivotally secured at one end thereof to said movable bridging member and at the other end thereof to said rotatable element, a housing formed of sides, ends and a top member which housing cooperates with said supporting member to enclose said facing ends of said pair of fixed electrodes, said movable bridging member, said rotatable element and camming surface, said pivoted link and said guide elements, and guide extensions supported by the top member of said housing cooperating with the guide elements positioned at each end of said movable bridging member to ensure that the movement of said movable member upon rotation of said rotatable element is in a plane perpendicular to the plane of said fixed electrodes.

References Cited in the file of this patent

UNITED STATES PATENTS

| | | |
|---|---|---|
| 1,635,544 | Crichton | July 12, 1927 |
| 1,856,407 | Apple | May 3, 1932 |
| 1,935,509 | Leeah et al. | Nov. 14, 1933 |